(12) United States Patent
Benthien et al.

(10) Patent No.: US 10,882,639 B2
(45) Date of Patent: Jan. 5, 2021

(54) TRANSPORTATION SYSTEM, AND RELATED SYSTEM AND METHOD FOR TRANSFERRING LUGGAGE INTO A TRANSPORTATION SYSTEM

(71) Applicant: Airbus Operations GmbH, Hamburg (DE)

(72) Inventors: Hermann Benthien, Hamburg (DE); Matthias Hegenbart, Hamburg (DE); Thomas Lerche, Hamburg (DE); Tobias-Valentin Mayer, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 258 days.

(21) Appl. No.: 16/172,564

(22) Filed: Oct. 26, 2018

(65) Prior Publication Data

US 2019/0135453 A1  May 9, 2019

(30) Foreign Application Priority Data

Nov. 8, 2017 (DE) .................. 10 2017 126 160
Nov. 20, 2017 (DE) .................. 10 2017 127 324

(51) Int. Cl.
*B64F 1/305* (2006.01)
*B64C 1/22* (2006.01)
*B64F 1/36* (2017.01)
*B64D 9/00* (2006.01)

(52) U.S. Cl.
CPC .............. *B64F 1/305* (2013.01); *B64C 1/22* (2013.01); *B64F 1/368* (2013.01); *B64D 2009/006* (2013.01)

(58) Field of Classification Search
CPC . B64F 1/22; B64F 1/305; B64F 1/368; B64D 2009/006
USPC ........................................... 14/71.5
See application file for complete search history.

(56) References Cited

U.S. PATENT DOCUMENTS

| 3,599,262 | A | * | 8/1971 | Carder | B65G 69/24 |
| | | | | | 14/71.5 |
| 3,913,757 | A | * | 10/1975 | Lovey | B65G 69/24 |
| | | | | | 414/390 |
| 6,487,743 | B1 | * | 12/2002 | Nicoletti | B64F 1/305 |
| | | | | | 14/71.3 |
| 6,659,704 | B2 | * | 12/2003 | Fukuhara | B64F 1/3055 |
| | | | | | 14/71.5 |

(Continued)

*Primary Examiner* — Raymond W Addie
(74) *Attorney, Agent, or Firm* — Greer, Burns & Crain, Ltd.

(57) ABSTRACT

A transfer system for transferring luggage into a vehicle having a freight hold opening and a passenger compartment opening arranged at the same level outside the vehicle. The system has a luggage transfer element and a passenger bridge, wherein the passenger bridge has a transition zone that can be simultaneously connected to the freight hold opening and the passenger compartment opening. The luggage transfer element has a housing module for receiving luggage, and a movement module for transferring the luggage transfer element. The luggage transfer element can be transferred through the transition zone and the freight hold opening by way of the movement module. The system avoids delays as the passengers are boarding and simplifies the transfer of luggage into a freight hold.

14 Claims, 7 Drawing Sheets

(56) References Cited

U.S. PATENT DOCUMENTS

| | | | |
|---|---|---|---|
| 6,745,423 B1* | 6/2004 | Hutton | B64F 1/3055 14/71.5 |
| 6,863,243 B2* | 3/2005 | Konya | B64F 1/305 14/71.5 |
| 7,168,119 B1* | 1/2007 | Telford | B64F 1/3055 14/71.5 |
| 7,549,607 B2 | 6/2009 | McCoskey et al. | |
| 8,484,786 B2* | 7/2013 | Anderberg | E01D 15/24 14/71.5 |
| 2004/0060128 A1* | 4/2004 | Konya | B64F 1/3055 14/71.5 |
| 2004/0143916 A1* | 7/2004 | Ratliff | B64F 1/3055 14/71.5 |
| 2004/0148716 A1* | 8/2004 | Hutton | B64F 1/3055 14/71.5 |
| 2008/0098537 A1* | 5/2008 | Hutton | B64F 1/305 14/71.5 |
| 2015/0298823 A1* | 10/2015 | Cox | B64F 1/305 14/71.5 |

* cited by examiner

TRANSPORTATION SYSTEM, AND RELATED SYSTEM AND METHOD FOR TRANSFERRING LUGGAGE INTO A TRANSPORTATION SYSTEM

CROSS-REFERENCE TO PRIORITY APPLICATIONS

This application claims the benefit of, and priority to, German patent application number DE 10 2017 126 160.5, filed Nov. 8, 2017, and to German patent application number DE 10 2017 127 324.7, filed Nov. 20, 2017. The content of the referenced applications is incorporated by reference herein.

TECHNICAL FIELD

Embodiments of the subject matter described herein relate generally to a transportation system, and to a system and a method for transferring luggage into a transportation system.

BACKGROUND

Means of transport (also referred to herein as a transportation system, e.g., a vehicle) for carrying passengers generally comprise luggage storage areas in the passenger cabins, in which the passengers can stow their luggage. In this context, there is a known practice of storing the luggage of the passengers in special freight holds of the transportation system before the transportation system is boarded, and therefore the passengers take only hand luggage with them into the passenger cabin. When boarding passenger aircraft, trains or buses, the passengers enter the passenger cabin and store their luggage in the luggage storage areas while looking for a seat. Owing to the limited storage capacity of the luggage storage areas, there can be delays as the passengers are boarding and alighting since the aisles between the seats are obstructed by passengers who are looking for somewhere to stow their luggage as they board or are trying to reach the place where their luggage is stored as they leave.

According to patent document U.S. Pat. No. 7,549,607 B2, passengers stow their luggage in storage compartments of a freight container before boarding an aircraft. The freight container is then transferred by means of a lift to a freight level situated below the passenger level and then transferred into the freight hold by means of a conveyor belt.

BRIEF SUMMARY

It is the object of the disclosure to provide a system and a method which avoid delays as the passengers board and simplifies the transfer of luggage into a freight hold.

The object is achieved by the features of the independent claims. Advantageous developments form the subject matter of the dependent claims and of the following description.

The disclosure provides a system for transferring luggage into a transportation system which has at least one freight hold opening and at least one passenger compartment opening, which are arranged at the same level on the outside of the transportation system, wherein the system has at least one luggage transfer element; and at least one passenger bridge for passengers, wherein the at least one passenger bridge has a transition zone, which can be simultaneously connected to the freight hold opening and the passenger compartment opening, wherein the luggage transfer element has a housing module for receiving luggage and a movement module for transferring the luggage transfer element, and wherein the luggage transfer element can be transferred through the transition zone and the freight hold opening by way of the movement module.

The disclosure provides a transfer system for a transportation system in which the transportation system has a freight hold opening and a passenger compartment opening at the same level on the outside of the transportation system. Here, the passenger bridge offers simultaneous access to the passenger compartment opening and to the freight hold opening by means of the transition zone. In this case, the luggage transfer element is initially arranged in the passenger bridge as the passengers board the transportation system. The passengers can place and stow their luggage, whether hand luggage or large luggage, in the housing modules of the luggage transfer element as they board and can then enter the transportation system through the passenger compartment opening. The luggage transfer element can be transferred through the freight hold opening by means of the transition zone. Here, the transfer of the luggage transfer element through the transition zone can start while the passengers are still boarding. In this case, the passengers can initially load that part of the luggage transfer element which is closest to the freight hold opening, for example. As soon as this part of the luggage transfer element has been loaded, the luggage transfer element can already be transferred partially through the freight hold opening into the freight hold of the transportation system. The passengers can then fill the remaining areas of the luggage transfer element with luggage. This simplifies the transfer of the luggage into the freight hold of the transportation system and avoids delays during boarding since the passengers halt in the relatively wide passenger bridge if they want to stow luggage and do not obstruct the aisles in the transportation system.

It is advantageous if the transition zone can be connected simultaneously to a plurality of passenger compartment openings and a plurality of freight hold openings.

It is advantageous if the system has at least two passenger bridges, wherein the passenger bridges are designed for arrangement on opposite sides of a transportation system, and wherein each passenger bridge has at least one luggage transfer element.

One advantageous possibility is to combine the two passenger bridges and to form a large passenger bridge which encloses the transportation system on both sides. The transportation system can thus be entered from both sides relative to its longitudinal axis if passenger openings are provided on both sides. The large passenger bridge can be part of a building that serves as an adapter for the head or the rear end of the transportation system.

This enables a transportation system which has two parallel aisles within the passenger compartment to be filled more quickly than with just one passenger bridge. The arrangement of two passenger bridges on opposite sides of the transportation system makes available a dedicated passenger bridge for each aisle, thus reducing the waiting time for passengers within the aisles. With two passenger bridges, it is furthermore also possible to make available two luggage transfer elements, thus also speeding up the acceptance of the luggage.

It is furthermore advantageous if the at least one passenger bridge has a slope relative to a horizontal in a range of from +/−45°, preferably +/−30°, as a further preference +/−15°, as a further preference +/−5°, wherein the movement module has a braking device for blocking a movement of the luggage transfer element, and wherein the movement module performs a movement in accordance with the slope of the passenger bridge when the braking device is released.

In this way, luggage transfer elements can be transferred into the transportation system and out of the transportation system solely by means of gravity, provided that the braking device is not activated. The braking device is only activated when the luggage transfer element has reached its envisaged position. This facilitates the loading and unloading of the luggage transfer element.

Provision is furthermore advantageously made for the movement module to be supported in such a way as to be movable along a rail, which has a first component in the passenger bridge and a second component in a freight hold assigned to the freight hold opening, wherein the first and the second component are releasably connected by means of a coupling element between the passenger bridge and the freight hold opening.

This provides a rail system on which the luggage transfer element follows a predefined path when it is being transferred between the passenger bridge and the transportation system. This avoids a situation where the luggage transfer element obstructs the passenger bridge or the passenger compartment opening.

According to an expedient possibility, an autonomous mobile lifting device for raising the at least one luggage transfer element can be provided, which is designed to move the at least one luggage transfer element through the transition zone.

By means of an autonomous mobile lifting device, which can be a lifting and transfer robot, for example, a large number of luggage transfer elements can be made available independently of one another in the passenger bridge and stowed in the freight hold.

It is advantageous if the at least one luggage transfer element has at least two storage compartments for luggage, wherein each storage compartment is assigned a lock element, which is preferably linked to the boarding card.

In this way, the storage compartments of the luggage transfer element can each be assigned to one passenger, with the result that there is a reserved storage facility for the luggage of each passenger.

It is advantageous if the at least one luggage transfer element has a fixing element for releasably fixing the luggage transfer element in a freight hold of a transportation system.

By means of the fixing element, the luggage transfer element can be fixed in the freight hold, thus avoiding slipping of the luggage transfer element. This increases the safety of transportation in the transportation system and avoids damage to the stowed pieces of luggage.

According to the disclosure, a transportation system is furthermore provided, comprising at least one freight hold opening and at least one passenger compartment opening, wherein the at least one freight hold opening and the at least one passenger compartment opening are arranged at the same level on the outside of the transportation system, wherein the at least one freight hold opening adjoins the at least one passenger compartment opening and is designed for connection to a transition zone of a passenger bridge.

Arranging the passenger compartment opening and the freight hold opening adjacent to one another has the effect that the freight hold can be loaded via the passenger bridge by means of which the passengers are transferred to the passenger compartment. This gives the passengers the opportunity to fill the freight hold with their luggage. The disclosure furthermore provides a transfer system for a transportation system in which the transportation system has a freight hold opening and a passenger compartment opening at the same level on the outside of the transportation system. Here, the passenger bridge offers simultaneous access to the passenger compartment opening and to the freight hold opening by means of the transition zone. In this case, the luggage transfer element is initially arranged in the passenger bridge as the passengers board the transportation system. The passengers can place and stow their luggage, whether hand luggage or large luggage, in the housing modules of the luggage transfer element as they board and can then enter the transportation system through the passenger compartment opening. The luggage transfer element can be transferred through the freight hold opening by means of the transition zone. Here, the transfer of the luggage transfer element through the transition zone can start while the passengers are still boarding. In this case, the passengers can initially load that part of the luggage transfer element which is closest to the freight hold opening, for example. As soon as this part of the luggage transfer element has been loaded, the luggage transfer element can already be transferred partially through the freight hold opening into the freight hold of the transportation system. The passengers can then fill the remaining areas of the luggage transfer element with luggage.

In this case, it is advantageous if the transportation system is a flying wing aircraft or has a transition-free wing-body combination (blended-wing configuration).

Aircraft of this kind provide a passenger compartment and freight holds which are arranged laterally on the passenger compartment. The passenger compartment is thus situated between two freight holds, each of which has a dedicated freight hold opening. Thus, the luggage does not have to be transferred at a level below the passenger compartment, as with hitherto conventional aircraft. This simplifies the filling of the freight hold by the passengers.

According to the disclosure, a method is furthermore provided for transferring luggage into a transportation system, wherein the transportation system has at least one freight hold opening and at least one passenger compartment opening, which are arranged at the same level on the outside of the transportation system, wherein the method has the following steps: a) connecting a transition zone of a first passenger bridge to a first freight hold opening, b) making available a luggage transfer element, which has a housing module for receiving luggage and a movement module for transferring the luggage transfer element, in a first passenger bridge by means of the movement module; c) loading the housing module with luggage; and d) transferring the luggage transfer element along the first passenger bridge through the transition zone and the freight hold opening by means of the movement module.

It is advantageous if the method additionally has the following step: e) securing the luggage transfer element in a freight hold assigned to the freight hold opening by means of a fixing element, wherein the fixing element fixes the luggage transfer element in the freight hold.

It is expedient if step a) has the following subordinate step: a1) connecting a transition zone of a second passenger bridge to a second freight hold opening on an opposite side of the transportation system from the first freight hold opening.

Moreover, it is advantageous if the method additionally has the following step: f) transferring the luggage transfer element from the freight hold, through the first or a second freight hold opening, to a third passenger bridge after transportation of the luggage transfer element by means of the transportation system.

During transfers between two transportation systems, it is possible in this way for the luggage transfer elements to be transferred from the freight hold of one transportation system to the freight hold of another transportation system, which the passenger is boarding.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1A:
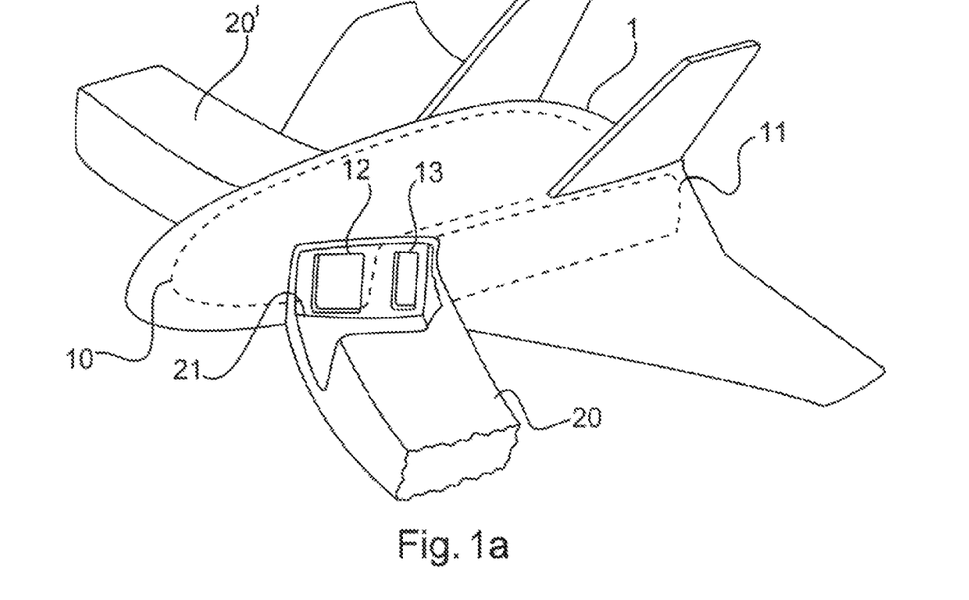
FIGS. 1a, 1b, and 1c show a schematic illustration of a transportation system (vehicle) with components of the system.

FIG. 1a illustrates a transportation system 1 in the form of a flying wing aircraft. However, the transportation system 1 can also be a conventional-bodied aircraft or some other aircraft or spacecraft, a ship or a land vehicle.

The transportation system 1 has a passenger compartment 10 and a freight hold 11. The passenger compartment 10 extends centrally in the transportation system 1, along the longitudinal axis. Freight hold 11 extends parallel to the passenger compartment 10 and to the longitudinal axis of the transportation system 1. The transportation system 1 can have a freight hold 11 on both sides of the passenger compartment 10, wherein the freight holds 11 extend parallel to the longitudinal axis of the transportation system 1.

Access to the passenger compartment 10 is provided by means of a passenger compartment opening 12, and access to the freight hold 11 is provided by means of a freight hold opening 13. In this arrangement, the passenger compartment opening 12 and the freight hold opening 13 form an opening through the outer shell of the transportation system 1. The passenger compartment opening 12 and the freight hold opening 13 are arranged adjacent to one another. In this arrangement, they can adjoin one another.

A passenger bridge 20, which can be arranged on the transportation system 1, is illustrated as a component of the system for transferring luggage into a transportation system. The passenger bridge 20 can also be referred to as the first passenger bridge. In FIG. 1a, the passenger bridge 20 is illustrated in such a way that part of the ceiling and the wall of the passenger bridge 20 in the vicinity of the transition zone 21 has been omitted in FIG. 1a in order to provide a better overview.

The passenger bridge 20 comprises a transition zone 21 and provides access for passengers to the passenger compartment opening 12 and to the freight hold opening 13. For this purpose, the transition zone 21 is arranged in such a way that the passenger compartment opening 12 and the freight hold opening 13 are surrounded by one end of the passenger bridge 20.

Another passenger bridge 20' can be arranged on the opposite side of the transportation system 1 from passenger bridge 20. In this way, access to the transportation system 1 is possible from two sides, enabling a transportation system 1 which has two aisles for the passengers in the passenger compartment 10 to be boarded via a dedicated passenger bridge 20, 20' for each of the aisles. Passenger bridge 20' has the same elements as passenger bridge 20. On the side on which passenger bridge 20' is arranged, the transportation system 1 in this case also has a passenger compartment opening 12 and a freight hold opening 13, which are arranged adjacent to one another.

Figure 1B:
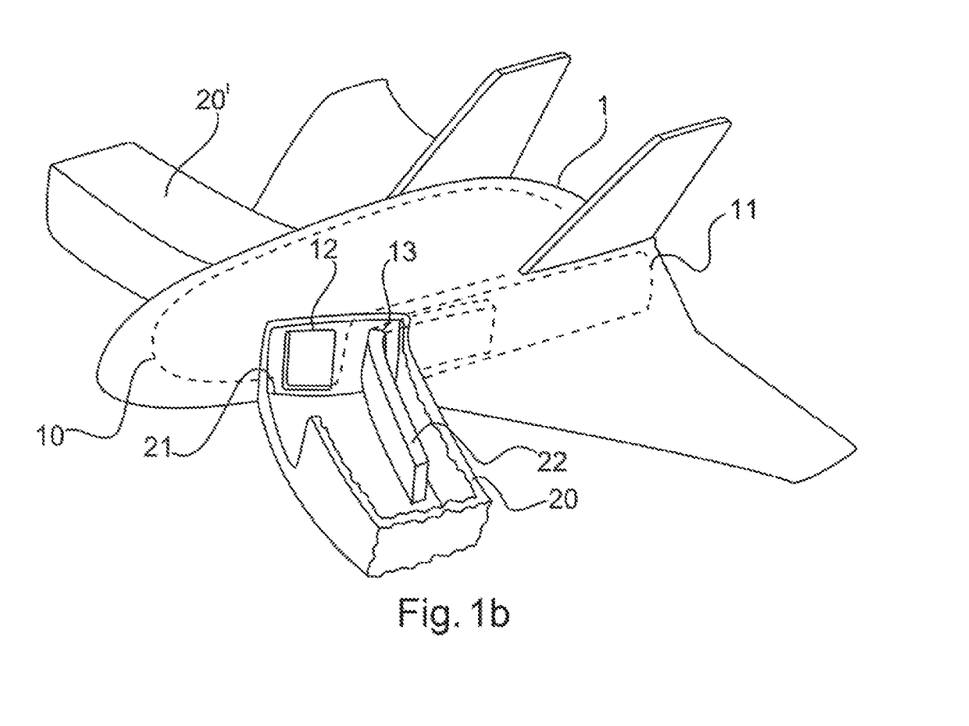

FIG. 1b illustrates the transportation system 1 shown in FIG. 1a, wherein, in FIG. 1b, a larger part of the ceiling region than in FIG. 1a is not illustrated in order to provide an improved overview.

A luggage transfer element 22 is illustrated in the passenger bridge 20 and in the freight hold 11. In FIG. 1b, the luggage transfer element 22 extends from passenger bridge 20, through the freight hold opening 13, into the freight hold 11 of the transportation system 1. That part of the luggage transfer element 22 which is in the freight hold 11 of the transportation system 1 is not accessible to the passengers. That part of the luggage transfer element 22 which is arranged in passenger bridge 20 can be filled with pieces of luggage by the passengers who are in passenger bridge 20. After this, the passengers can enter the passenger compartment 10 through the passenger compartment opening 12.

The luggage transfer element 22 can be moved backward and forward between the freight hold 11 and passenger bridge 20 through the freight hold opening 13 and the transition zone 21. Furthermore, the luggage transfer element 22 can also be moved away from the transportation system 1 via passenger bridge 20 in order to be moved to another passenger bridge 20 and another transportation system 1.

Figure 1C:
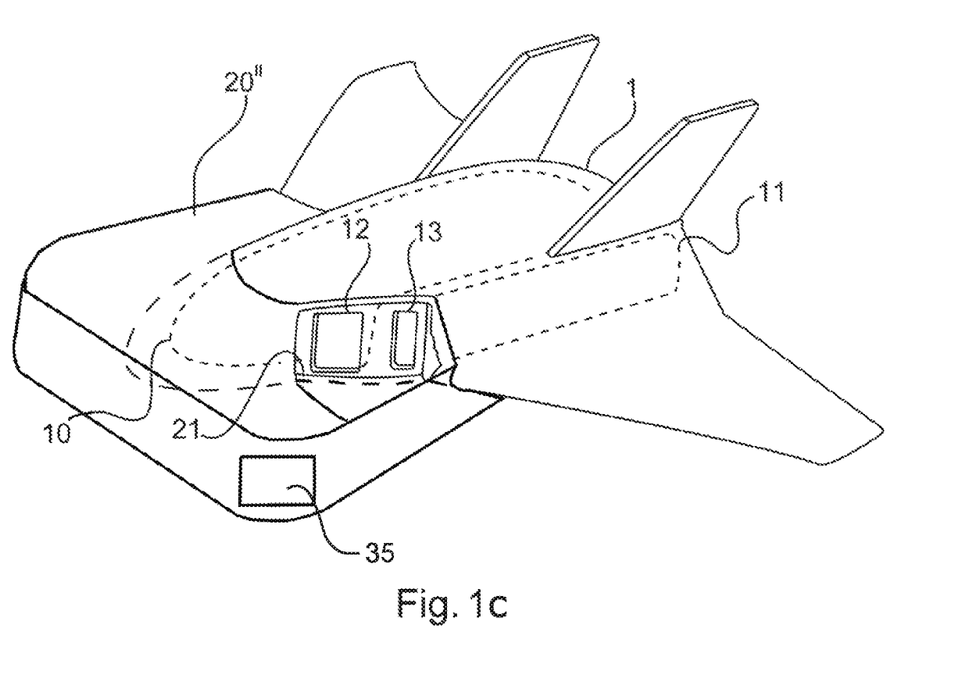

FIG. 1c shows a large passenger bridge 20", which encloses the transportation system 1 on both sides. Here, the large passenger bridge 20" can have one or more access openings 35, which can form a link with an airport terminal. The transportation system 1 can thus be entered from both sides relative to its longitudinal axis via the transition zone 21, wherein the transportation system 1 has passenger openings 12 on both sides. The passenger opening 12 on the side facing away from the plane of the drawing is concealed by the transportation system. The large passenger bridge 20" can also be part of a building that serves as an adapter for the head or the rear end of the transportation system 1. The transition zone 21 of the large passenger bridge 20" can furthermore also form an access to freight hold openings 13 on both sides of the transportation system 1.

Figure 2A:
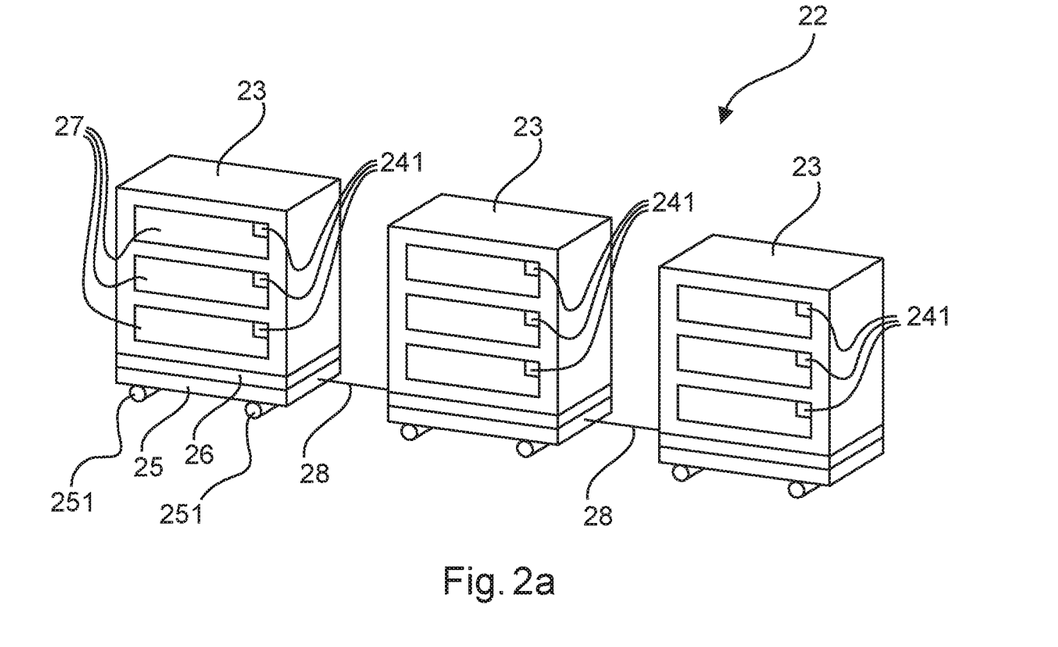
FIGS. 2a, and 2b show schematic illustrations of a luggage transfer element.

A luggage transfer element 22 is illustrated in FIG. 2a. In this embodiment, the luggage transfer element 22 has three housing modules 23. However, it can have any number of housing modules 23.

The housing modules 23 are suitable for receiving luggage and can be coupled to one another by means of connecting elements 28 to form a train. According to FIG. 2b, a housing module 23 can have storage compartments 24 for luggage. A storage compartment 24 can be closed by a cover element 27. In one embodiment, it is possible in this case for one cover element 27 to close other storage compartments 24 of a housing module 23. In an alternative embodiment, a cover element 27 can close just one storage compartment 24, each storage compartment 24 thus having a dedicated cover element 27.

Figure 2B:
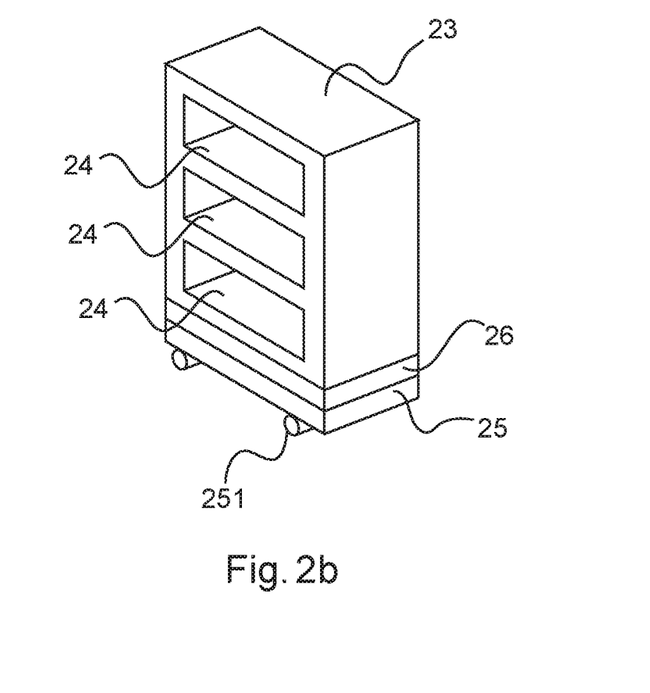

Each storage compartment 24 is assigned a lock element 241, wherein the lock element 241 is linked to a boarding card of a passenger. Thus, a storage compartment 24 can only be opened if a boarding card that is linked to the lock element 241 is available. Thus, a storage compartment 24 can be assigned to a single passenger. This speeds up the unloading process since each passenger who has introduced a piece of luggage into a storage compartment 24 when loading can go to the storage compartment 24 used by them when unloading without hindering other passengers while unloading by searching for the storage compartment 24 that they have used.

Furthermore, the luggage transfer element 22 has a movement module 25. In the embodiment illustrated, the movement module 25 has rollers 251. By means of the rollers 251, the luggage transfer element 22 can be moved. The rollers 251 can be driven by a motor, which is supplied with energy by a supply system 26, which can be designed as a battery module. This enables the luggage transfer elements 22 to be moved autonomously.

Figure 3:
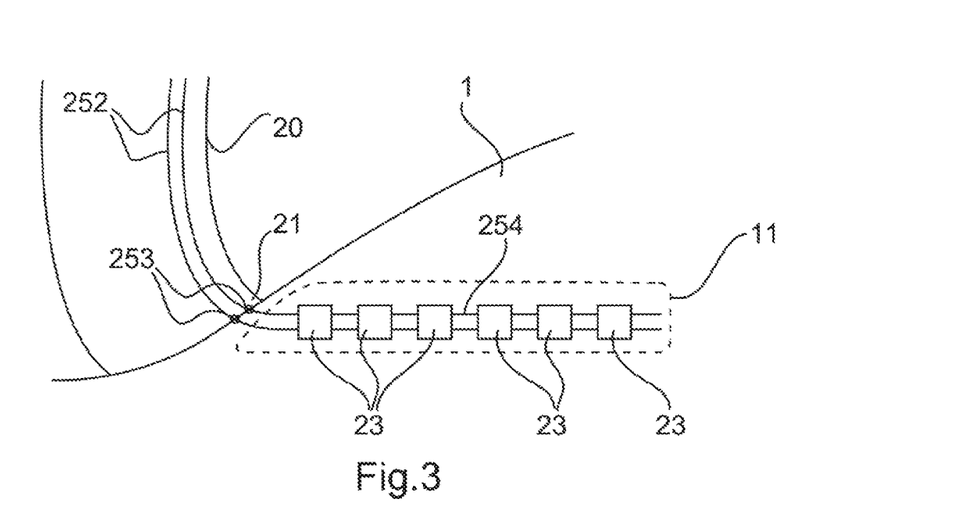
FIG. 3 shows a schematic illustration of fixed luggage transfer elements.

FIG. 3 shows another embodiment of the luggage transfer element 22. Here, the movement module 25 is mounted on rails, wherein the rails comprise two components 252 and 254. The movement module 25 thus moves the luggage transfer element 22 along the rails. The rails extend through the passenger bridge 20, the transition zone 21 and the freight opening 13 into the freight hold 11. In this case, one component 252 of the rails is arranged in the passenger bridge 20, and the other component 254 is arranged in the freight hold 11. A coupling element 253 connects the two components 252 and 254 in the transition zone 21. When the passenger bridge 20 is removed from the transportation system 1, the coupling element 253 can release the components 252 and 254 from each other. In this case, the rails can also extend beyond the passenger bridge 20 into a luggage handling building. In this case, a connection between the different passenger bridges 20 can be established by means of the rails, thus enabling the luggage transfer element 22 to be moved between the passenger bridges 20 along the rails. The rails can be arranged above or below the luggage transfer element 22. It is thus also possible to mount the movement module 25 above or below the housing module 23. In one arrangement of the movement module 25, the luggage transfer element 22 hangs from the rail. When the movement module 25 is arranged below the luggage transfer element 22, the luggage transfer element 22 is arranged on the rail.

Figure 4A:
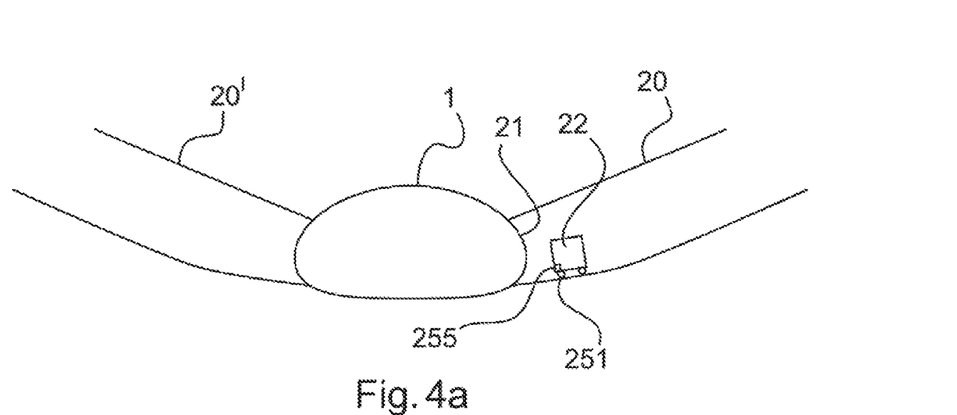
FIGS. 4a, and 4b show schematic illustrations of sloping passenger bridges on the transportation system.
Figure 4B:
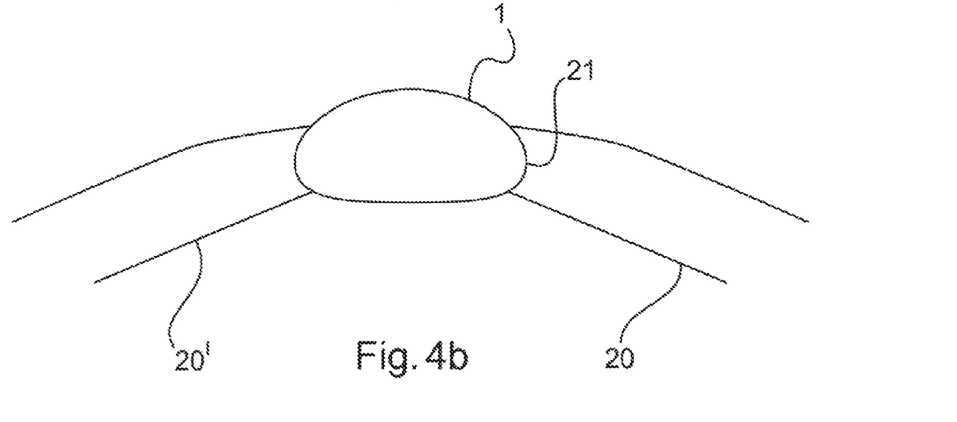

FIGS. 4a and 4b show an alternative embodiment for driving the luggage transfer element 22. In this case, the luggage transfer element 22 is transferred into the transportation system 1 and out of the transportation system 1 by means of gravity. Here, the passenger bridges 20, 20' are connected in a sloping manner to the transportation system 1, wherein the slope is in a range of at most 15° to the horizontal in order to avoid making the movement of the passengers more difficult.

In FIG. 4a, a slope of the passenger bridge 20, 20' which is provided when loading the transportation system 1 is shown. In this case, the passenger bridge 20, 20' slopes relative to the transportation system 1, i.e. the end piece of the passenger bridge 20, 20', on which the transition zone 21 is arranged, is mounted lower than the opposite end piece of the passenger bridge 20, 20'.

Here, the luggage transfer element 22 has a movement module 25 that has rollers 251. Furthermore, the movement module 25 in this embodiment has a braking device 255, by means of which the rollers 251 can be braked and locked when required. Thus, a movement of the luggage transfer element 22 is also blocked by means of the braking device 255. By means of the braking device 255, the luggage transfer element 22 can thus be brought to a halt within the sloping passenger bridge 20, 20' in order to load or unload it. To transfer the luggage transfer element 22 into the freight hold 11, the braking device 255 is merely released, thus allowing the rollers 251 to roll freely again. By virtue of gravity, the luggage transfer element 22 is conveyed along the sloping passenger bridge 20, 20' into the freight hold 11.

FIG. 4b shows passenger bridges 20, 20' in which the transition zone 21 is mounted higher than the opposite end piece of passenger bridge 20. A luggage transfer element 22 which is designed in accordance with the description relating to FIG. 4a will be driven by gravity along the slope of the passenger bridge 20, 20' within passenger bridge 20, provided that the braking device 255 has been released.

Figure 5A:
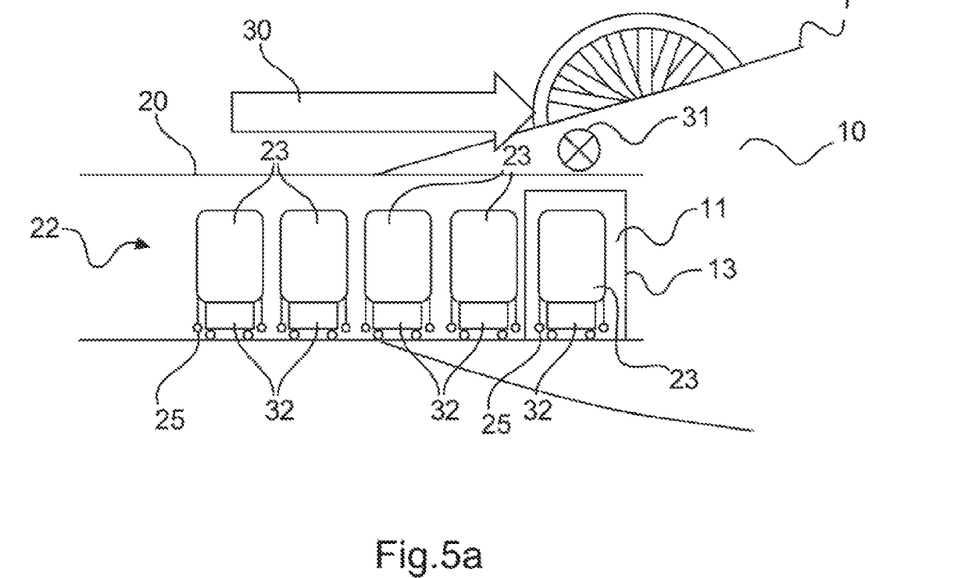
FIGS. 5a-5d show schematic illustrations of the transfer of luggage transfer elements.

FIG. 5a illustrates a luggage transfer element 22 in which the individual housing modules 23 are raised and transferred by mobile lifting devices 32. For this purpose, the housing module 23 is arranged on a raised movement module 25, wherein the mobile lifting device 32 can move under the movement module 25 and thus under the housing module 23 in order to raise the housing module 23 together with the movement module 25.

Here, arrow 30 shows the direction of movement of the luggage transfer element 22 as it enters the transportation system 1. The mobile lifting devices 32 transfer the housing modules 23 along passenger bridge 20 in the direction of arrow 30. As they enter the freight hold 11, the housing modules 23 are moved by means of the mobile lifting devices 32 in the direction of arrow 31, which points into the plane of the drawing.

Figure 5B:
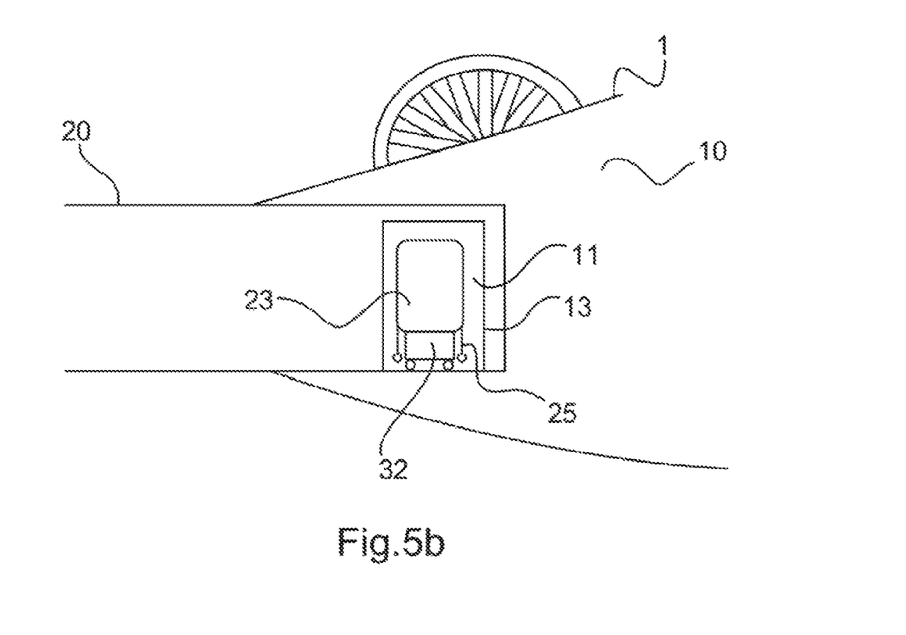

FIG. 5b shows a situation in which all the housing modules 23 have been introduced into the freight hold 11 by means of the mobile lifting device 32. Here, passenger bridge 20 has been cleared of the luggage transfer element 22. At this point, the housing modules 23 are set down by the mobile lifting devices 32.

Figure 5C:
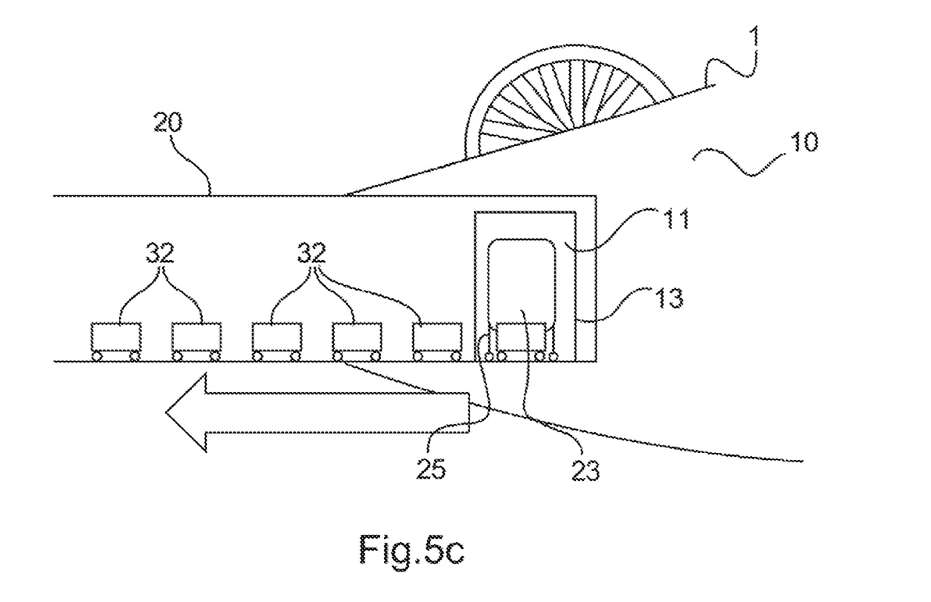

FIG. 5c illustrates how the mobile lifting devices 32 leave the freight hold 11 and move back into a luggage handling building via passenger bridge 20. In the freight hold 11, the housing modules 23 are mounted on the corresponding movement modules 25. If no mobile lifting devices 32 can be provided at the destination of the transportation system 1, the luggage transfer element 22 is transferred out of the freight hold 11 of the transportation system 1 by means of the movement modules 25.

Figure 5D:
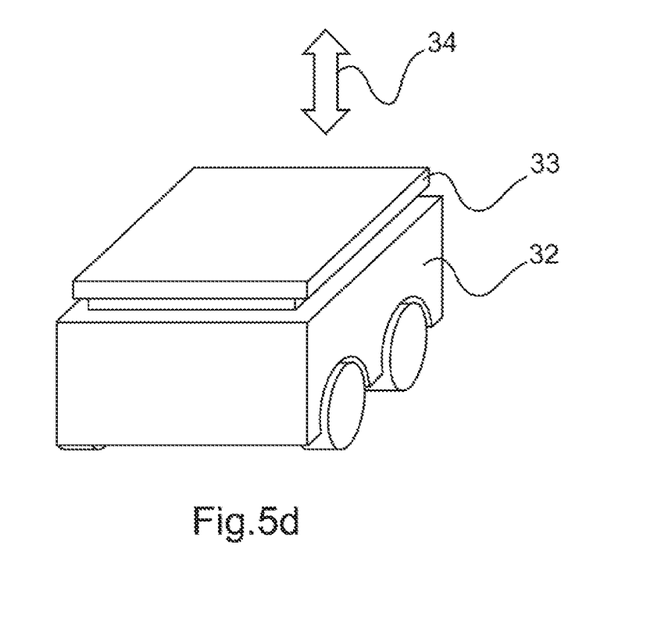

FIG. 5d shows a mobile lifting device 32. The mobile lifting device 32 comprises a lifting element 33, which can be moved backward and forward upwards in a vertical direction by the mobile lifting device 32. The direction of movement of the lifting element 33 is indicated by arrow 34.

Figure 6:
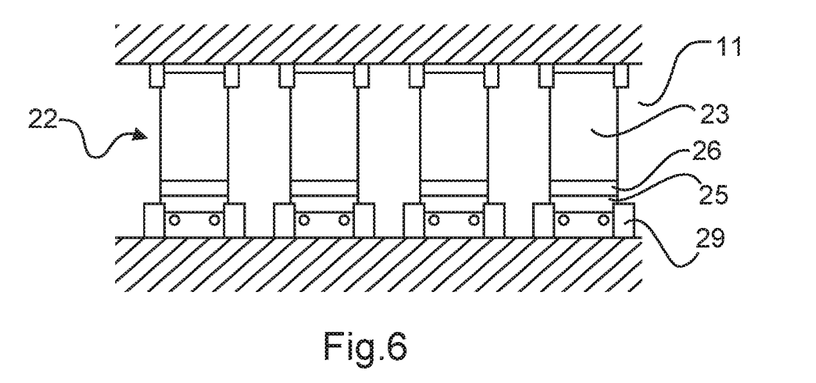
FIG. 6 shows a schematic illustration of luggage transfer elements in a freight hold.

According to FIG. 6, the housing modules 23 of the luggage transfer element 22 can be connected to the transportation system 1 in the freight hold 11 by means of fixing elements 29. In the embodiment described here, the housing module 23 is held from above by four clamp halves. The housing module 23 is furthermore likewise raised and held fast by four clamp halves at the lower end on the movement module 25. The clamp halves can additionally or alternatively be connected to the housing modules 23 by screw fastening or quick-release fasteners.

Figure 7:
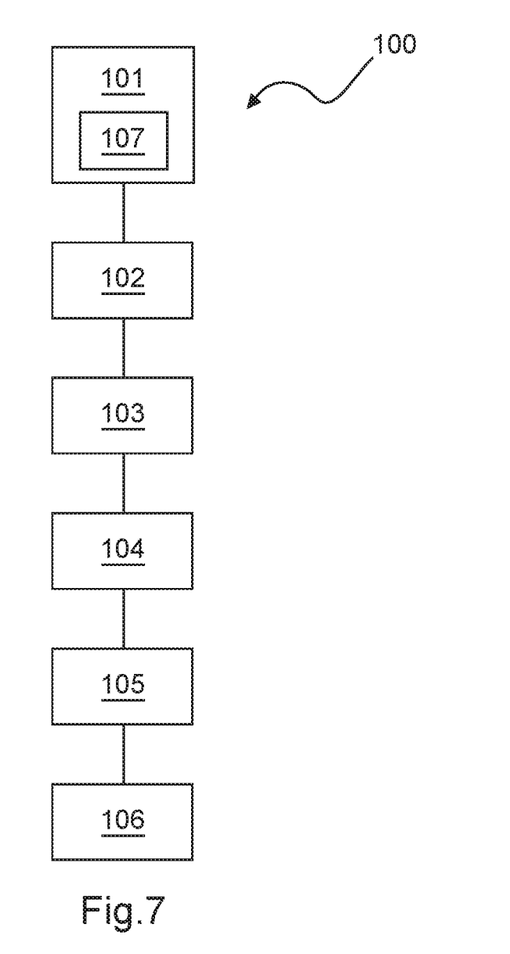
FIG. 7 shows a schematic flow diagram of the method.

FIG. 7 shows a schematic flow diagram of the method 100 for transferring luggage into a transportation system. In FIG. 1a, the transportation system 1 is shown in the form of a flying wing aircraft. However, the transportation system 1 can also be a conventional-bodied aircraft or some other aircraft or spacecraft, a ship or a land vehicle.

The transportation system 1 has a passenger compartment 10 and a freight hold 11. The passenger compartment 10 extends centrally in the transportation system 1, along the longitudinal axis. Freight hold 11 extends parallel to the passenger compartment 11 and to the longitudinal axis of the transportation system 1. The transportation system 1 can have a freight hold 11 on both sides of the passenger compartment 10, wherein the freight holds 11 extend parallel to the longitudinal axis of the transportation system 1.

Access to the passenger compartment 10 is provided by means of a passenger compartment opening 12, and access to the freight hold 11 is provided by means of a freight hold opening 13. In this arrangement, the passenger compartment opening 12 and the freight hold opening 13 form an opening through the outer shell of the transportation system 1. The passenger compartment opening 12 and the freight hold opening 13 are arranged adjacent to one another. In this arrangement, they can adjoin one another.

A passenger bridge 20, which can be arranged on the transportation system 1, is illustrated as a component of the system for transferring luggage into a transportation system. The passenger bridge 20 can also be referred to as the first passenger bridge. In FIG. 1a, the passenger bridge 20 is illustrated in such a way that part of the ceiling and the wall of the passenger bridge 20 in the vicinity of the transition zone 21 has been omitted in FIG. 1a in order to provide a better overview.

The passenger bridge 20 comprises a transition zone 21 and provides access for passengers to the passenger compartment opening 12 and to the freight hold opening 13. For this purpose, the transition zone 21 is arranged in such a way that the passenger compartment opening 12 and the freight hold opening 13 are surrounded by one end of the passenger bridge 20. According to step a), the transition zone 21 is thereby connected 101 to the freight hold opening 13.

Another passenger bridge 20' can be arranged on the opposite side of the transportation system 1 from passenger bridge 20 and, according to step a1), can be connected to another freight hold opening of the transportation system. The further passenger bridge 20' can also be referred to as the second passenger bridge. In this way, access to the transportation system 1 is possible from two sides, enabling a transportation system 1 which has two aisles for the passengers in the passenger compartment 10 to be boarded via a dedicated passenger bridge 20, 20' for each of the aisles. Passenger bridge 20' has the same elements as passenger bridge 20. On the side on which passenger bridge 20' is arranged, the transportation system 1 in this case also has a passenger compartment opening 12 and a freight hold opening 13, which are arranged adjacent to one another.

A luggage transfer element 22 is illustrated in the passenger bridge 20 and in the freight hold 11. According to step b), the luggage transfer element 22 is provided 102 by means of a movement module 25 in the passenger bridge. In FIG. 1b, the luggage transfer element 22 extends from passenger bridge 20, through the freight hold opening 13, into the freight hold 11 of the transportation system 1. That part of the luggage transfer element 22 which is in the freight hold 11 of the transportation system 1 is not accessible to the passengers. That part of the luggage transfer element 22 which is arranged in passenger bridge 20 can be filled with pieces of luggage or loaded 103 in accordance with step c) by the passengers who are on passenger bridge 20. After this, the passengers can enter the passenger compartment 10 through the passenger compartment opening 12.

According to step d), the luggage transfer element 22 can be moved backward and forward 104 between the freight hold 11 and passenger bridge 20 through the freight hold opening 13 and the transition zone 21 by means of the movement module 25. Furthermore, the luggage transfer element 22 can also be moved away from the transportation system 1 via passenger bridge 20 in order to be moved to another passenger bridge 20 and another transportation system 1.

Furthermore, according to step f), the luggage transfer element 22 can be transferred 106 from the first passenger bridge 20 to a third passenger bridge, which can be connected to another transportation system.

FIG. 1c shows a large passenger bridge 20", which encloses the transportation system 1 on both sides. Here, the large passenger bridge 20" can have one or more access openings 35, which can form a link with an airport terminal. The transportation system 1 can thus be entered from both sides relative to its longitudinal axis via the transition zone 21, wherein the transportation system 1 has passenger openings 12 on both sides. The passenger opening 12 on the side facing away from the plane of the drawing is concealed by the transportation system. The large passenger bridge 20" can also be part of a building that serves as an adapter for the head or the rear end of the transportation system 1. The transition zone 21 of the large passenger bridge 20" can furthermore also form an access to freight hold openings 13 on both sides of the transportation system 1.

A luggage transfer element 22 is illustrated in FIG. 2a. In this embodiment, the luggage transfer element 22 has three housing modules 23. However, it can have any number of housing modules 23.

The housing modules 23 are suitable for receiving luggage and can be coupled to one another by means of connecting elements 28 to form a train. According to FIG. 2b, a housing module 23 can have storage compartments 24 for luggage. A storage compartment 24 can be closed by a cover element 27. In one embodiment, it is possible in this case for one cover element 27 to close other storage compartments 24 of a housing module 23. In an alternative embodiment, a cover element 27 can close just one storage compartment 24, each storage compartment 24 thus having a dedicated cover element 27.

Each storage compartment 24 is assigned a lock element 241, wherein the lock element 241 is linked to a boarding card of a passenger. Thus, a storage compartment 24 can only be opened if a boarding card that is linked to the lock element 241 is available. Thus, a storage compartment 24 can be assigned to a single passenger. This speeds up the unloading process since each passenger who has introduced a piece of luggage into a storage compartment 24 when loading can go to the storage compartment 24 used by them when unloading without hindering other passengers while unloading by searching for the storage compartment 24 that they have used.

Furthermore, the luggage transfer element 22 has a movement module 25. In the embodiment illustrated, the movement module 25 has rollers 251. By means of the rollers 251, the luggage transfer element 22 can be moved. The rollers 251 can be driven by a motor, which is supplied with energy by a supply system 26, which can be designed as a battery module. This enables the luggage transfer elements 22 to be moved autonomously.

FIG. 3 shows another embodiment of the luggage transfer element 22. Here, the movement module 25 is mounted on rails, wherein the rails comprise two components 252 and 254. The movement module 25 thus moves the luggage transfer element 22 along the rails. The rails extend through the passenger bridge 20, the transition zone 21 and the freight opening 13 into the freight hold 11. In this case, one component 252 of the rails is arranged in the passenger bridge 20, and the other component 254 is arranged in the freight hold 11. A coupling element 253 connects the two components 252 and 254 in the transition zone 21. When the passenger bridge 20 is removed from the transportation system 1, the coupling element 253 can release the components 252 and 254 from each other. In this case, the rails can also extend beyond the passenger bridge 20 into a luggage handling building. In this case, a connection between the different passenger bridges 20 can be established by means of the rails, thus enabling the luggage transfer element 22 to be moved between the passenger bridges 20 along the rails. The rails can be arranged above or below the luggage transfer element 22. It is thus also possible to mount the movement module 25 above or below the housing module 23. In one arrangement of the movement module 25, the luggage transfer element 22 hangs from the rail. When the movement module 25 is arranged below the luggage transfer element 22, the luggage transfer element 22 is arranged on the rail.

FIGS. 4a and 4b show an alternative embodiment for driving the luggage transfer element 22. In this case, the luggage transfer element 22 is transferred into the transportation system 1 and out of the transportation system 1 by means of gravity. Here, the passenger bridges 20, 20' are connected in a sloping manner to the transportation system 1, wherein the slope is in a range of at most 15° to the horizontal in order to avoid making the movement of the passengers more difficult.

In FIG. 4a, a slope of the passenger bridge 20, 20' which is provided when loading the transportation system 1 is shown. In this case, the passenger bridge 20, 20' slopes relative to the transportation system 1, i.e. the end piece of the passenger bridge 20, 20', on which the transition zone 21 is arranged, is mounted lower than the opposite end piece of the passenger bridge 20, 20'.

Here, the luggage transfer element 22 has a movement module 25 that has rollers 251. Furthermore, the movement module 25 in this embodiment has a braking device 255, by means of which the rollers 251 can be braked and locked when required. Thus, a movement of the luggage transfer element 22 is also blocked by means of the braking device 255. By means of the braking device 255, the luggage transfer element 22 can thus be brought to a halt within the sloping passenger bridge 20, 20' in order to load or unload it. To transfer the luggage transfer element 22 into the freight hold 11, the braking device 255 is merely released, thus allowing the rollers 251 to roll freely again. By virtue of gravity, the luggage transfer element 22 is conveyed along the sloping passenger bridge 20, 20' into the freight hold 11.

FIG. 4b shows passenger bridges 20, 20' in which the transition zone 21 is mounted higher than the opposite end piece of passenger bridge 20. A luggage transfer element 22 which is designed in accordance with the description relating to FIG. 4a will be driven by gravity along the slope of the passenger bridge 20, 20' within passenger bridge 20, provided that the braking device 255 has been released.

FIG. 5a illustrates a luggage transfer element 22 in which the individual housing modules 23 are raised and transferred by mobile lifting devices 32. For this purpose, the housing module 23 is arranged on a raised movement module 25, wherein the mobile lifting device 32 can move under the movement module 25 and thus under the housing module 23 in order to raise the housing module 23 together with the movement module 25.

Here, arrow 30 shows the direction of movement of the luggage transfer element 22 as it enters the transportation system 1. The mobile lifting devices 32 transfer the housing modules 23 along passenger bridge 20 in the direction of arrow 30. As they enter the freight hold 11, the housing modules 23 are moved by means of the mobile lifting devices 32 in the direction of arrow 31, which points into the plane of the drawing.

FIG. 5b shows a situation in which all the housing modules 23 have been introduced into the freight hold 11 by means of the mobile lifting device 32. Here, passenger bridge 20 has been cleared of the luggage transfer element 22. At this point, the housing modules 23 are set down by the mobile lifting devices 32.

FIG. 5c illustrates how the mobile lifting devices 32 leave the freight hold 11 and move back into a luggage handling building via passenger bridge 20. In the freight hold 11, the housing modules 23 are mounted on the corresponding movement modules 25. If no mobile lifting devices 32 can be provided at the destination of the transportation system 1, the luggage transfer element 22 is transferred out of the freight hold 11 of the transportation system 1 by means of the movement modules 25.

FIG. 5d shows a mobile lifting device 32. The mobile lifting device 32 comprises a lifting element 33, which can be moved backward and forward upwards in a vertical direction by the mobile lifting device 32. The direction of movement of the lifting element 33 is indicated by arrow 34.

According to FIG. 6, the housing modules 23 of the luggage transfer element 22 can be connected to the transportation system 1 in the freight hold 11 by means of fixing elements 29. In the embodiment described here, the housing module 23 is held from above by four clamp halves. The housing module 23 is furthermore likewise raised and held fast by four clamp halves at the lower end on the movement module 25. The clamp halves can additionally or alternatively be connected to the housing modules 23 by screw fastening or quick-release fasteners. According to step e), the luggage transfer element can thereby be secured 105 in the freight hold.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A transfer system for transferring luggage into a transportation system which has at least one freight hold opening and at least one passenger compartment opening, which are arranged at a common level outside of the transportation system, wherein the transfer system comprises:
    a luggage transfer element; and
    a passenger bridge for passengers;
    wherein the passenger bridge has a transition zone, which can be simultaneously connected to the freight hold opening and the passenger compartment opening;
    wherein the luggage transfer element has a housing module for receiving luggage and a movement module for transferring the luggage transfer element; and
    wherein the luggage transfer element can be transferred through the transition zone and the freight hold opening by the movement module.

2. The transfer system according to claim 1, wherein the transition zone can be connected simultaneously to a plurality of passenger compartment openings and a plurality of freight hold openings.

3. The transfer system according to claim 1, wherein:
    the transfer system has at least two passenger bridges;
    the passenger bridges are designed for arrangement on opposite sides of the transportation system; and
    each passenger bridge comprises at least one luggage transfer element.

4. The transfer system according to claim 1, wherein:
    the passenger bridge has a slope relative to a horizontal in a range of +/−45°;
    the movement module comprises a braking device for blocking a movement of the luggage transfer element; and
    the movement module performs a movement in accordance with the slope of the passenger bridge when the braking device is released.

5. The transfer system according to claim 1, wherein:
    the movement module is supported to be movable along a rail, which has a first component in the passenger bridge and a second component in a freight hold assigned to the freight hold opening; and
    the first and the second component are releasably connected by a coupling element between the passenger bridge and the freight hold opening.

6. The transfer system according to claim 1, further comprising an autonomous mobile lifting device for raising the luggage transfer element, which is configured to move the luggage transfer element through the transition zone.

7. The transfer system according to claim 1, wherein the luggage transfer element comprises at least two storage compartments for luggage, wherein each storage compartment is assigned a lock element, which is linked to the boarding card.

8. The transfer system according to claim 1, wherein the luggage transfer element comprises a fixing element to releasably fix the luggage transfer element in a freight hold of the transportation system.

9. A transportation system comprising:
    a freight hold opening; and
    a passenger compartment opening;
    wherein the freight hold opening and the passenger compartment opening are arranged at a common level outside of the transportation system; and
    wherein the freight hold opening adjoins the passenger compartment opening, and is configured to connect to a transition zone of a passenger bridge.

10. The transportation system according to claim 9, wherein the transportation system is a flying wing aircraft or has a transition-free wing-body combination.

11. A method for transferring luggage into a transportation system which has at least one freight hold opening and at least one passenger compartment opening, which are arranged at a common level outside of the transportation system, wherein the method comprises the steps of:
    connecting a transition zone of a first passenger bridge to a first freight hold opening;
    making available a luggage transfer element, which has a housing module for receiving luggage and a movement module for transferring the luggage transfer element, in a first passenger bridge, by operating the movement module;
    loading the housing module with luggage; and
    transferring the luggage transfer element along the first passenger bridge through the transition zone and the freight hold opening, by operating the movement module.

12. The method according to claim 11, further comprising the step of:
    securing the luggage transfer element in a freight hold assigned to the freight hold opening by a fixing element, wherein the fixing element fixes the luggage transfer element in the freight hold.

13. The method according to claim 11, wherein the step of connecting the transition zone comprises:
    connecting a transition zone of a second passenger bridge to a second freight hold opening on an opposite side of the transportation system from the first freight hold opening.

14. The method according to claim 11, further comprising the step of:
    transferring the luggage transfer element from the freight hold, through the first or a second freight hold opening, to a third passenger bridge after transportation of the luggage transfer element by way of the transportation system.

* * * * *